United States Patent
Colasurdo et al.

(10) Patent No.: US 8,275,889 B2
(45) Date of Patent: Sep. 25, 2012

(54) CLONE-MANAGED SESSION AFFINITY

(75) Inventors: David B. Colasurdo, Raleigh, NC (US); Michael L. Fraenkel, Raleigh, NC (US); Srinivas Hasti, Durham, NC (US); Gabe G. Montero, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 2605 days.

(21) Appl. No.: 10/166,299

(22) Filed: Jun. 10, 2002

(65) Prior Publication Data
US 2003/0229817 A1 Dec. 11, 2003

(51) Int. Cl.
G06F 15/16 (2006.01)
(52) U.S. Cl. ........ 709/227; 709/223; 709/228; 709/229; 709/238
(58) Field of Classification Search .................. 709/227, 709/223, 228, 229, 238
See application file for complete search history.

(56) References Cited

U.S. PATENT DOCUMENTS

| | | | | |
|---|---|---|---|---|
| 4,975,914 | A | 12/1990 | Ashton et al. | 371/11.2 |
| 5,027,269 | A | 6/1991 | Grant et al. | 364/200 |
| 5,499,342 | A | 3/1996 | Kurihara et al. | 395/200.12 |
| 5,608,865 | A | 3/1997 | Midgely et al. | 395/180 |
| 5,774,668 | A * | 6/1998 | Choquier et al. | 709/223 |
| 5,951,694 | A | 9/1999 | Choquier et al. | 714/15 |
| 6,055,574 | A | 4/2000 | Smorodinsky et al. | 709/226 |
| 6,609,159 | B1 * | 8/2003 | Dukach et al. | 719/331 |
| 6,859,834 | B1 * | 2/2005 | Arora et al. | 709/227 |
| 2002/0161839 | A1 * | 10/2002 | Colasurdo et al. | 709/204 |

FOREIGN PATENT DOCUMENTS

| | | | |
|---|---|---|---|
| EP | 1041496 A2 | * | 10/2000 |
| WO | WO 01/13228 A2 | * | 2/2000 |
| WO | WO01/13228 | | 2/2001 |

OTHER PUBLICATIONS

Alex C. Snoeren, et al., Fine-Grained Failover Using Connection Migration, *Proceedings of 3rd USENIX Symposium on Internet Technologies and Systems*, pp. 221-232, (2001).
K. Zatwarnicki, Load Balancing Algorithms in Locally Distributed Web Systems, *Studia Informatica*, vol. 22, No. 1, pp. 147-162, (2001).
M. Rumsewicz, et al., Preferential Load Balancing for Distributed Internet Servers, *Proceedings First IEEE/ACM International Symposium on Cluster Computing and the Grid*, pp. 363-370 (May 15-18, 2001).
J. Bacon, et al., Mobile Applications for Ubiquitous Environments, *ICL Systems Journal*, vol. 12, No. 2, pp. 264-288, (Nov. 1997).
R. Vingralek, et al., A Transparent Replication of HTTP Service, *Proceedings of the 15th International Conference on Data Engineering*, p. 97, (1999).

(Continued)

*Primary Examiner* — Liangche A Wang
(74) *Attorney, Agent, or Firm* — Steven M. Greenberg, Esq.; Carey, Rodriguez, Greenberg & O'Keefe

(57) ABSTRACT

A clone managed session affinity system, method and apparatus. A clone-managed session affinity method includes receiving a request from a client. The request includes a reference to a selected clone with which the client has a session affinity relationship. The clone determines whether a session affinity cancellation condition has arisen. If the clone determines that a session affinity termination condition has arisen, the session affinity relationship is cancelled.

22 Claims, 3 Drawing Sheets

OTHER PUBLICATIONS

K. Spencer, Web Dev: Using Session and Application Variables, Store Session Information Easily With These Variables, *SQLServer Magazine*, (Jan. 2000).

Welcome to IBM WebSphere Application Server, *IBM WebSphere Application Server Version 3.5 Advanced Edition*, <http://www-4.ibm.com/software/webservers/appserv/doc/v35/aes/infocenter/was/welcome.html> (Apr. 18, 2002).

Getting Started With IBM WebSphere Application Server, *IBM WebSphere Application Server Version 4.0*, <http://www-4.ibm.com/software/webservers/appserv/doc/v40/aes/infocenter/was/welcome.html>, (Apr. 18, 2002).

About Cloning Applications, *IBM WebSphere Application Server Version 3*, <http://www-3.ibm.com/software/webservers/appserv/doc/v30/se/web/help/model.htm>, (Apr. 12, 2002).

V. Viswanathan, Load Balancing Web Applications, *O'Reilly Network*, <http://www.onjava.com/lpt/a//onjava/2001/09/26/load.html>, (Sep. 28, 2001).

*HP Bluestone Load Balance Broker Algorithm*, Hewlett-Packard Company, (2001).

* cited by examiner

CLONE-MANAGED SESSION AFFINITY

BACKGROUND OF THE INVENTION

1. Statement of the Technical Field

The present invention relates to load balancing among server and server process clones, and more particularly to session affinity within a server group.

2. Description of the Related Art

A model is a template for creating additional, nearly identical copies of a server or process instance, such as an application server or Web container. The copies of the server or process instances are commonly referred to as "clones". In consequence, the act of creating a clone has been commonly referred to as "cloning". Cloning provides several advantages over the mere freestanding replication of a server or process instance. Some advantages include improved fail-over support, workload management, and efficient vertical scaling. For instance, in the case of fail-over, with several cloned servers or process instances available to handle requests, it is more likely that failures will not damage the throughput and reliability of the system. That is, if one clone fails, another can be used. In the case of vertical scaling, the expansive resources of an under-utilized host server can be consumed.

In the case of workload management, when a model changes, the changes can propagate to all cloned servers and server processes based upon the model without requiring the manual application of those changes to individual freestanding replicants. Also, being able to route a request to any server or server process in a group of identical servers or server processes can allow the host servers in the group to share work. Thus, throughput of method invocations can be improved. Finally, requests can be evenly distributed to host servers to prevent workload imbalances in which one or more host servers have ideal or low activity while others are overburdened. This "load balancing" activity often is viewed as the principle benefit of workload management.

In typical server cloning environments, session affinity can be applied. Session affinity refers to the logical linkage between a requesting client and a responsive clone or process in a server group, where both the requesting client and the responsive clone have engaged in a communicative session. In particular, within a session, once a server clone has been selected to respond to the requests of a client, the selected clone can remain bound to the requesting client throughout the duration of the session. As a result of this binding, the prevailing selection policy need be applied only once in a session and the overhead resulting from the needless re-application of the selection policy can be avoided. Presently, session based affinity can be implemented using either a cookie-based approach, or a URL rewriting approach as is known in the art. Traditional session affinity strategies can fall victim to typical scaling issues. For instance, the session between a clone and client can randomly "time out", based upon the inactivity of a particular session. In consequence, the work load experienced across the server group can settle into a pattern where certain clones are processing significantly more requests than other clones.

In order to address this issue, some load balancing techniques utilize timeout logic in a second cookie when using a cookie-based session affinity approach. The use of a second cookie cannot accommodate a URL rewriting approach as is common in the art. In particular, the security concerns of end-users often precludes the use of a cookie-based approach to session affinity.

Notably, conventional clone architectures require management of session affinity in a centralized workload manager. In this way, session affinity can be determined in a single location based upon the loads experienced by all managed clones. To support a centralized workload manager, however, given the possibility of a session affinity time out condition, clones must flush session state information to the centralized persistent store after each client transaction, thus unnecessarily consuming additional network resources. Hence, conventional session affinity techniques can be viewed as inherently deficient in the face of a scalable server group.

SUMMARY OF THE INVENTION

The present invention overcomes the limitations of conventional load balancing systems which enforce session affinity in a centralized workload manager using strictly a cookie-based approach, and provides a novel and non-obvious method, system and apparatus for clone-managed session affinity. In accordance with the present invention, a clone-managed session affinity method can include receiving a request from a client. The request can include a reference to a selected clone with which the client has a session affinity relationship. The clone can determine whether a session affinity cancellation condition has arisen. If the clone determines that a session affinity termination condition has arisen, the session affinity relationship can be cancelled. Also, the session data stored in the selected clone can be flushed to common persistent storage.

In one aspect of the invention, the canceling step can include the step of omitting the reference from a response to the request and forwarding the response to the client. In another aspect of the invention, the canceling step can include the step of removing the reference from the request and forwarding the request to a load balancing workload manager. In yet another aspect of the invention, the canceling step can include the steps of: identifying a substitute clone; removing the reference from the request; and, forwarding the request to the identified substitute clone. Finally, in yet another aspect of the invention, the canceling step can include the steps of: identifying a substitute clone; replacing the reference in the request with a reference to the identified substitute clone; and, forwarding the request to a load balancing workload manager.

Notably, the determination step can include the step of determining in the selected clone whether a session affinity timeout condition has arisen in the selected clone. Alternatively, the determination step can include the step of determining in the selected clone whether an excessive load condition has arisen in the selected clone. Upon determining that an excessive load condition has arisen, a less loaded substitute clone can be identified. Once identified, the reference in the request either can be replaced with a reference to the substitute clone or removed without replacement. Subsequently, the request can be re-routed to the substitute clone. In addition to session affinity timeout and the detection of an excessive load condition, the clone also can use any other pre-determined or programmatically determined criteria in the determination step to decide whether or not to terminate a session affinity relationship.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for clone-managed session affinity in a load balancing system. In accordance with the present invention, a session affinity relationship between clone and client can arise based upon a request by the client and the clone selection policies of a workload manager. Once a clone has been selected by the workload manager, the request can be routed to the selected clone and the clone can append its identity to a response to the request. Subsequent requests by the client can include the clone identity and the subsequent requests can be automatically routed to the clone as indicated by the request.

Importantly, each clone, rather than the workload manager, can manage the session affinity relationship with its respective clients. For instance, each clone can detect the occurrence of a session affinity timeout condition, and upon detecting the timeout condition, the clone can cancel the session affinity relationship by removing a reference to the clones identity from any response to the request. Alternatively, each clone can predict a prospective session affinity timeout condition and can cancel the session affinity relationship in order to level the load among other clones. In each case, however, both the corresponding client and the workload manager will treat a subsequent request as if that subsequent request had not been processed by a clone. Thus, the session affinity assignment can be processed anew in the workload manager.

Figure 1:
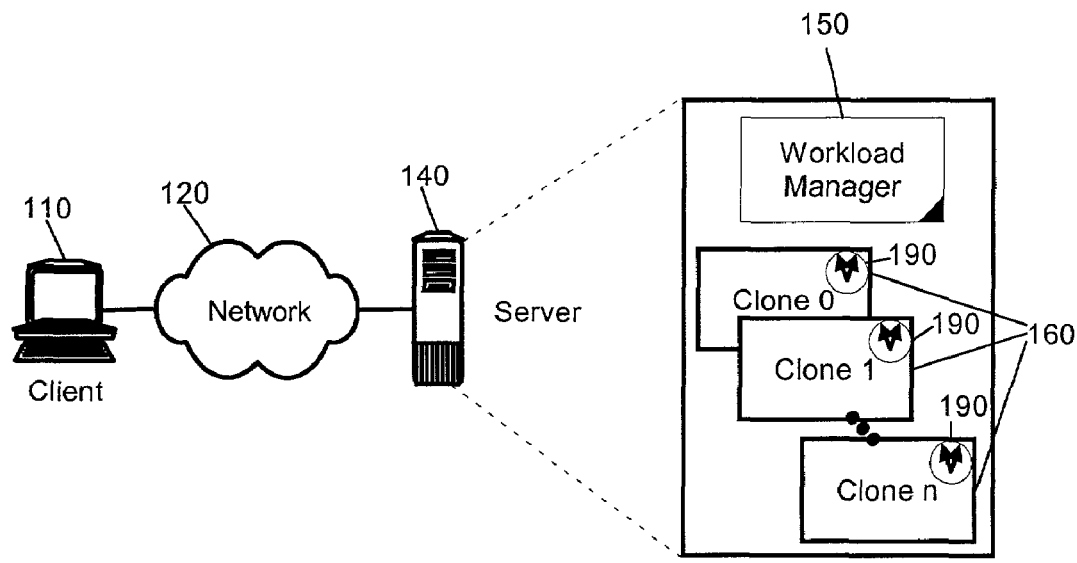
FIG. 1 is a schematic illustration of a load balancing server system configured with a workload manager for routing server requests to specific clones according to the clone-managed session affinity method of the present invention; and, FIGS. 2A, 2B, 3A and 3B, taken together, are a pictorial representation of a method for managing session affinity within a clone in a server group.

FIG. 1 is a schematic illustration of a load-balancing server system configured with a workload manager for routing requests from clients to respective clones according to the clone-managed session affinity method of the present invention. As shown in FIG. 1, a load-balancing system server system can include a server 140 communicatively linked to one or more clients 110 over a data communications network 120. The server 140 can process client 110 requests for services and data, and in that regard, the server 140 can be viewed as a host to one of a content server or an application server. Still, the invention is not limited in this regard and the server 140 can behave as a proxy or intermediate routing server to additional hosts configured with one or more content or application servers. In the latter case, the server 140 can process network requests destined for multiple hosts disposed about a wide-area or global data communications network. In any case, FIG. 1 depicts merely a single server 140 for the sake of simplicity.

As shown in FIG. 1, in order to implement a cloning strategy, one or more clones 160 can be managed in the server 140. In that regard, a workload manager 150 can process requests from the clients 110 and can assign particular ones of the clones 160 to respond to the requests. Though the invention is not so limited, the selection of a particular one from among the clones 160 can proceed according to well-known selection techniques, including random, transaction optimized, and round-robin techniques.

Regardless of the selection technique, session affinity logic associated with or included within the workload manager 150 can ensure that a series of requests from an individual client 110 are processed by the same clone 160. In this sense, a session can be formed between the client 110 and corresponding clone 160. Typical methods of affecting session affinity can include, but are not limited to, a cookie-based approach, a hidden fields approach, an SSL-data based approach, and a URL rewriting approach, each of which are well-known in the art.

As will be recognized by one skilled in the art in reference to FIG. 1, the load balancing system of the present invention is not merely limited to a single group of clones which have been disposed within the server. Rather, in accordance with the inventive arrangements, multiple remote servers can host one or more respective clones. In that case, a network dispatcher can route requests from the clients to selected ones of the servers whose respective workload managers, in turn, can initially assign session affinity with clones disposed therein. Importantly, regardless of the configuration, during the course of a session affinity relationship between client 110 and clone 160, session state information need not be flushed to the persistent store subsequent to each request-response transaction between client 110 and clone 160.

Significantly, unlike conventional session affinity management strategies, in the present invention, each clone 160 can include session affinity management logic 190. Specifically, upon processing a received transaction request from client 110 routed through the workload manager 150, the session affinity management logic 190 can determine whether a session affinity timeout condition has occurred. This determination can be performed based upon comparing the current time with the time when the session affinity originally had been established. If the difference between both times exceeds a pre-configured value, then it can be concluded that a session affinity timeout condition has occurred.

Upon detecting a session affinity timeout condition, the session affinity management logic 190 can cancel the session affinity relationship between client 110 and host clone 160 by removing clone identifying information from any response to a transaction request from the client 110. Alternatively, the host clone 160 can decline to respond to the request from the client 110 and can defer the session affinity reassignment task to the workload manager 150 by stripping the request of clone identifying information and re-submitting the request to the workload manager 150 as if the revised request had originated in the client 110. Finally, the session affinity management logic 190 can directly re-assign the session affinity relationship to another clone 160 simply by forwarding the revised request to another lesser loaded clone 160. In all cases, however, the session state data associated with the relationship between client 110 and host clone 160 can be propagated to the next assigned clone 160 either by persisting the state to common storage, or by passing the state information to the workload manager 150.

Notably, in addition to detecting the occurrence of a session affinity time condition, the session affinity management logic 190 can predict a future session affinity time out condition in the host clone 160. Specifically, the session affinity management logic 190 can monitor the load experienced by the host clone 160 and where the monitored load exceeds that of a threshold load, or where the monitored load merely exceeds that of other clones 160 by a threshold amount, the session affinity management logic 190 can cancel the session affinity relationship between client 110 and host clone 160 in order to force the re-assignment of the session affinity relationship by the workload manager 150. Alternatively, the session affinity management logic 190 can directly re-assign the session affinity relationship to a lesser loaded clone 160.

FIGS. 2A, 2B, 3A and 3B, taken together, are a pictorial representation of a method for managing session affinity in a clone. Specifically, FIGS. 2A and 2B collectively illustrate the operation of the present invention in which session affinity can occur during periods which are absent of session affinity timeout conditions. In that regard, in FIG. 2A, a client 200 can transmit an initial request 205 to the host server 215 over the data communications network 210. The initial request 205 can lack clone identification data as no session has been established between the client 200 and a selected clone 220, 230, 240.

A workload manager 250 associated with or disposed within the host 215 can receive the initial request 205 and can determine from the omission of clone identification data that no particular clone 220, 230, 240 has been assigned to service the initial request 205. Thus, the workload manager 250 can undertake a selection process in order to select a suitable clone 220, 230, 240 to service the initial request 205. Importantly, though the invention is not so limited, the selection process can include any of the well-known techniques for routing requests to clones including load balancing techniques such as round-robin, transaction-oriented, and random techniques.

Figure 2A:
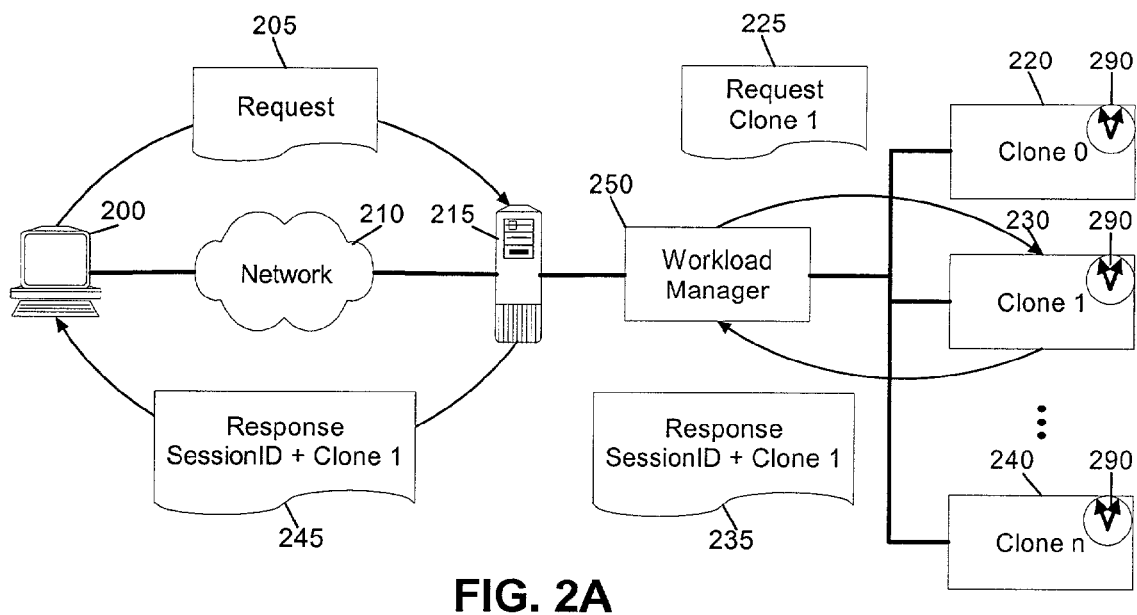

For exemplary purposes only, in FIG. 2A it will be apparent that the workload manager 250 can select the clone 230 to service the initial request 205. As such, the workload manager 250 can effectuate the routing of the request 225 to the selected clone 230. The selected clone 230 can service the routed request 225 and can issue a response 235. Notably, the response 235 can have appended thereto not only session identification data, but also a clone identifier which indicates that the selected clone 230 has serviced the routed request 225 and that session affinity now exists between the client 200 and the clone 230. Subsequently, the workload manager 250 can route the response 245 to the client 200.

Advantageously, unlike prior art session affinity implementations, session affinity can be managed in association with or as a component of the clone 230. Specifically, a session affinity management process 290 in the clone 230 can determine when a session affinity timeout condition has occurred or could possibly occur. This determination can be based either upon the load experienced by the clone, or upon the comparison of the current time with the time when the session affinity originally had been established. If the difference between both times exceeds a pre-configured value, then it can be concluded that a session affinity timeout condition has occurred.

Figure 2B:
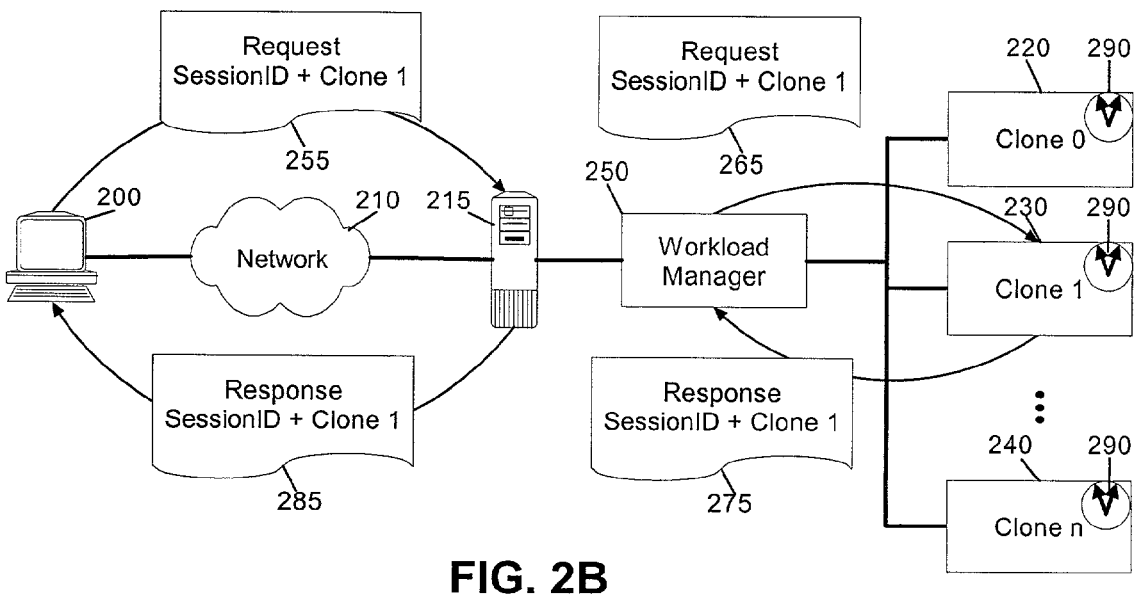

Hence, as shown in FIG. 2B, subsequent to the initial request 225—response 235 transaction, additional request 265 response 275 transactions can arise. For subsequent request-response transactions, however, both the clone identifier and the session identification data appended to the routed response 235 of FIG. 2A can be included as part of the subsequent request 255. Upon receiving the subsequent request 255, the workload manager 250 can identify the clone identification data in order to recognize that a session already is ongoing and that session affinity exists between the client 200 and the identified clone 230. Thus, upon identifying the selected clone 230, the workload manager 250 can forward the subsequent request 255 to the selected clone 230.

Upon processing of the subsequent request 265, the session affinity management process 290 first can ensure that a timeout condition has not yet occurred before servicing the subsequent request 265. As in the exemplary illustration of FIG. 2B, no session affinity timeout condition will have arisen. Hence, the session affinity relationship between the client 200 and the selected clone 230 can be maintained. Notably, in one embodiment of the present invention, the session affinity management process 290 can inspect the current load of the selected clone 230 to determine whether the session affinity relationship should be terminated.

In other alternative embodiments, the session affinity management process 290 can inspect the load of the selected clone 290 and the loads experienced by other clones 220, 240 to determine whether the load can be more evenly distributed across the other clones 220, 240. In this regard, the session affinity management process 290 can perform "load leveling". In any event, as shown in the exemplary embodiment, it will be assumed that for illustrative purposes only, session affinity can be maintained between the client 200 and the selected clone 230.

Figure 3A:
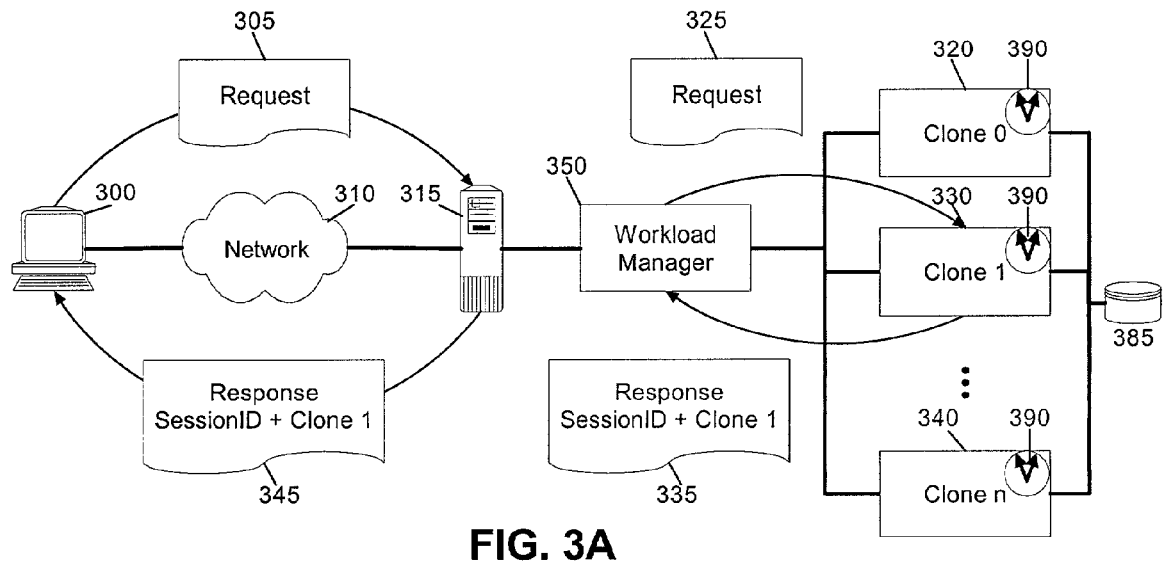
Figure 3B:
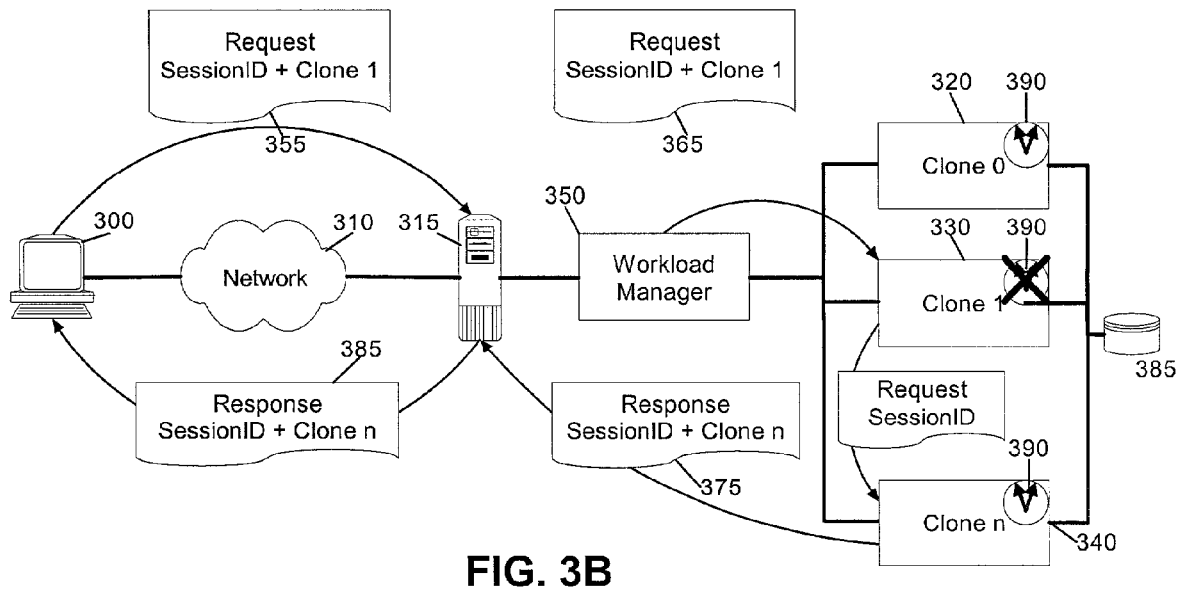

FIGS. 3A and 3B, in comparison to FIGS. 2A and 2B, collectively illustrate a clone-managed session affinity process in which a session affinity canceling condition has arisen. In that regard, in FIG. 3A, a client 300 can transmit an initial request 305 to the host 315 over the data communications network 310. The initial request 305 can lack both session and clone identification data as no session affinity has been established between the client 300 and a selected clone 320, 330, 340. A workload manager 350 associated with or disposed within the host 315 can receive the initial request 305 and can determine from the omission of clone identification data that no particular clone 320, 330, 340 has been assigned to service the initial request 305. Thus, the workload manager 350 can undertake a selection process in order to select a suitable server clone 320, 330, 340 to service the initial request 305.

Importantly, though the invention is not so limited, the selection process can include any of the well-known techniques for routing requests to clones including load balancing techniques such as round-robin, transaction-oriented, and random techniques. For exemplary purposes only, in FIG. 3A it will be apparent that the workload manager 350 can select the clone 330 to service the initial request 305. As such, the session manager 350 can effectuate the routing of the request 325 to the selected clone 330.

The selected clone 330 can service the routed request 325 and can issue a response 335. Notably, the response 335 can have appended thereto both session and clone identification data in order to indicate that the selected clone 330 has serviced the routed request 325 and that session affinity now exists between the client 300 and the selected clone 330. Subsequently, the workload manager 350 can route the response 345 to the client 300.

As in the case of FIGS. 2A and 2B, session affinity can be managed in association with or as a component of the clone 330. Specifically, a session affinity management process 390 can determine whether the load experienced by the selected clone merits the maintenance of session affinity with the client 300. For instance, the session affinity management process 390 can determine whether a timeout condition has arisen or is likely to arise. Alternatively, the session affinity management process 390 can predict whether a session affinity timeout condition will arise. Finally, the session affinity management process 390 can simply determine whether the load experienced by the clone 330 is such that the request 335 can be better serviced in another clone 320, 340.

In the exemplary illustration of FIG. 3B, it will be assumed that the session affinity management process 390 in the clone 330 has concluded that a session affinity timeout condition has occurred that should result in the termination of the session affinity relationship between the client 300 and the clone 330. For instance, the session affinity management process can compare the current time with the time when the session affinity originally had been established. If the difference between both times exceeds a pre-configured value, then it can be concluded that a session affinity timeout condition has occurred. The difference, as will be recognized by one skilled in the art, can be computed through the use of cookies, URL re-writing or any other useful tool for persisting time stamps and event data. In the alternative case, the session affinity management process 390 can monitor its current load and can conclude that based on the current load, the latency which will likely arise from a continuation of the session affinity relationship will not satisfy a level of responsiveness required or expected by the selected clone 330.

In any case, however, the session affinity management process 390 can cancel the session affinity relationship between the client 300 and the selected clone 330. Though many techniques exist for canceling the relationship, in one aspect of the invention, the clone 330 can strip the clone identification data for the clone 330 from any response 375 to the request 365. Alternatively, the clone 330 can decline to respond to the request 365 and, instead, the clone 330 can defer the response to a replacement clone, for instance clone 340. In that case, the request can be resubmitted to the workload manager 350 without a clone identifier so that the workload manager 350 will treat the request as if no session affinity relationship had been established for the client 300. Alternatively, the request can be directly forwarded to a selected replacement clone 340.

In any case, as the replacement clone 340 will require access to the session state information, the selected clone 330 can persist in fixed storage 385 of the workload manager 350 the current state of the session between the client 300 and clone 330. It will be recognized by one skilled in the art, however, that in consequence of the individual clones 320, 330, 340 managing session affinity, rather than the workload manager 350, session data need not be stored in persistent storage 385 after each state change in a session between client 300 and selected clone 330. This is because the selected clone 330 can be assured of receiving the subsequent request 355 so long as a session affinity timeout condition does not arise (or an excessive load). Rather, the session data need only be flushed to persistent storage 385 when a session affinity timeout condition has arisen, or an excessive load detected.

Once the session data has been flushed to persistent storage 385, the next assigned clone 320 can retrieve the session data from the persistent storage 385. Thus, session data integrity can be maintained. Importantly, by synchronizing state information in the persistent store only when a session affinity relationship has been canceled, performance gains can be achieved.

As will be recognized by one skilled in the art, managing session affinity by modifying clone identification data in requests and responses can induce a clone selection process outside of session affinity. This inducement can accommodate multiple session affinity techniques rather than mere cookie-based techniques. Specifically, the method of the present invention also can accommodate URL rewriting techniques, as can the method of the invention accommodate other session affinity techniques. Importantly, though the process exemplified in the collective illustrations of FIGS. 2A, 2B, 3A and 3B reflect the simplistic case of a single set of clones associated with a session manager, the invention is not so limited. Rather, as it will be apparent from the schematic illustration of FIG. 1, clone-managed session affinity can be performed in a scaled system of multiple server machine disposed remotely from one another about a data communications network.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A session affinity management method, the method comprising the steps of:
   receiving a first request from a client;
   establishing a session affinity relationship between the client and a clone selected by a load balancing workload manager based on clone selection policies;
   routing the first request to the selected clone;
   appending by the selected clone its identity to a response to the first request;
   subsequently receiving a second request from the client, said second request comprising a reference to the identity of the selected clone;
   automatically routing the second request to the selected clone;
   determining by said selected clone whether a session affinity cancellation condition has arisen; and,
   if a session affinity cancellation condition has arisen, canceling said session affinity relationship.

2. The method of claim 1, wherein said canceling step comprises the step of omitting said reference from a response to said second request and forwarding said response to said client.

3. The method of claim 1, wherein said canceling step comprises the step of removing said reference from said second request and forwarding said second request to the load balancing workload manager.

4. The method of claim 1, wherein said canceling step comprises the steps of:
   identifying a substitute clone;
   removing said reference from said second request; and,
   forwarding said second request to said identified substitute clone.

5. The method of claim 1, wherein said canceling step comprises the steps of:
   identifying a substitute clone;
   replacing said reference in said second request with a reference to said identified substitute clone; and,
   forwarding said second request to the load balancing workload manager.

6. The method of claim 1, wherein said determination step comprises the step of determining in said selected clone whether a session affinity timeout condition has arisen in said selected clone.

7. The method of claim 1, wherein said determination step comprises the step of determining in said selected clone whether an excessive load condition has arisen in said selected clone.

8. The method of claim 7, wherein said canceling step comprising the steps of:
 upon determining that an excessive load condition has arisen, identifying a less loaded substitute clone;
 replacing said reference in said second request with a reference to said substitute clone; and,
 re-routing said second request to said substitute clone.

9. The method of claim 7, wherein said canceling step comprising the steps of:
 upon determining that an excessive load condition has arisen, identifying a less loaded substitute clone;
 removing said reference from said second request; and,
 re-routing said second request to said substitute clone.

10. The method of claim 1, further comprising the step of flushing session data stored in said selected clone to common persistent storage responsive to determining that a session affinity cancellation condition has arisen.

11. A load balancing system comprising:
 a host;
 a plurality of clones disposed in said host, each clone including a session affinity management processor; and
 a workload manager associated with said host, said workload manager being configured to
  receive a first request from a client,
  select a clone based on clone selection policies to establish a session affinity relationship between the client and the selected clone, and
  route the first request to the selected clone;
 wherein the selected clone appends its identity to a response to the first request;
 wherein the workload manager is further configured to
  subsequently receive a second request from the client, the second request including a reference to the identity of the selected clone, and
  automatically route the second request to the selected clone;
 wherein the session affinity management processor in the selected clone determines whether a session affinity cancellation condition has arisen and cancels the session affinity relationship if a session affinity cancellation condition has arisen.

12. The load balancing system of claim 11, wherein said session affinity cancellation condition comprises one of a session affinity timeout condition and an excessive load condition.

13. A machine readable storage having stored thereon a computer program for managing session affinity, the computer program comprising a routine set of instructions for causing the machine to perform the steps of:
 receiving a first request from a client;
 establishing a session affinity relationship between the client and a clone selected by a load balancing workload manager based on clone selection policies;
 routing the first request to the selected clone;
 appending by the selected clone its identity to a response to the first request;
 subsequently receiving a second request from the client, said second request comprising a reference to the identity of the selected clone;
 automatically routing the second request to the selected clone;
 determining by said selected clone whether a session affinity cancellation condition has arisen; and,
 if a session affinity cancellation condition has arisen, canceling said session affinity relationship.

14. The machine readable storage of claim 13, wherein said canceling step comprises the step of omitting said reference from a response to said second request and forwarding said response to said client.

15. The machine readable storage of claim 13, wherein said canceling step comprises the step of removing said reference from said second request and forwarding said second request to the load balancing workload manager.

16. The machine readable storage of claim 13, wherein said canceling step comprises the steps of:
 identifying a substitute clone;
 removing said reference from said second request; and,
 forwarding said second request to said identified substitute clone.

17. The machine readable storage of claim 13, wherein said canceling step comprises the steps of:
 identifying a substitute clone;
 replacing said reference in said second request with a reference to said identified substitute clone; and,
 forwarding said second request to a load balancing workload manager.

18. The machine readable storage of claim 13, wherein said determination step comprises the step of determining in said selected clone whether a session affinity timeout condition has arisen in said selected clone.

19. The machine readable storage of claim 13, wherein said determination step comprises the step of determining in said selected clone whether an excessive load condition has arisen in said selected clone.

20. The machine readable storage of claim 19, wherein said canceling step comprising the steps of:
 upon determining that an excessive load condition has arisen, identifying a less loaded substitute clone;
 replacing said reference in said second request with a reference to said substitute clone; and,
 re-routing said second request to said substitute clone.

21. The machine readable storage of claim 19, wherein said canceling step comprising the steps of:
 upon determining that an excessive load condition has arisen, identifying a less loaded substitute clone;
 removing said reference from said second request; and,
 re-routing said second request to said substitute clone.

22. The machine readable storage of claim 13, further comprising the step of flushing session data stored in said selected clone to common persistent storage responsive to determining that a session affinity cancellation condition has arisen.

* * * * *